United States Patent [19]

Thompson

[11] Patent Number: 5,067,423
[45] Date of Patent: Nov. 26, 1991

[54] SEWING MACHINE DRIVE ASSEMBLY, INCLUDING PULLEY BELT TRACTION ENHANCEMENT DEVICE

[76] Inventor: Elmer R. Thompson, 2408 47th St., Lubbock, Tex. 79412

[21] Appl. No.: 534,049

[22] Filed: Jun. 6, 1990

[51] Int. Cl.$^5$ .............. D05B 69/12; F16H 7/12
[52] U.S. Cl. .................... 112/220; 474/134
[58] Field of Search ............ 112/220, 271; 474/133–137

[56] References Cited

U.S. PATENT DOCUMENTS

| | | | |
|---|---|---|---|
| 1,386,632 | 8/1921 | Kornas | 474/134 X |
| 2,152,038 | 3/1939 | Gettys | 474/133 X |
| 2,633,092 | 3/1953 | Robert et al. | 112/220 |
| 2,739,552 | 3/1956 | Sailer | 112/220 |
| 2,883,869 | 4/1959 | Schenkengel | 112/220 X |
| 2,995,380 | 8/1961 | King | 474/134 X |
| 3,186,003 | 5/1965 | Gregory et al. | 474/134 X |
| 4,416,647 | 11/1983 | White | 474/134 |
| 4,758,208 | 7/1988 | Bartos et al. | 474/134 X |
| 4,798,564 | 1/1989 | Benedict | 474/134 |
| 4,934,989 | 6/1990 | Furukawa et al. | 474/135 |

Primary Examiner—Werner H. Schroeder
Assistant Examiner—Ismael Izaguirre
Attorney, Agent, or Firm—Laney, Dougherty, Hessin & Beavers

[57] ABSTRACT

A sewing machine drive assembly having one or more pulleys and drive belts also includes a mechanism for enhancing traction between a belt and a pulley to resist slippage under maximum power to be coupled through the drive assembly from a motor to the crankshaft of the sewing machine. The traction enhancing mechanism includes a support member and belt engagement members connected to the support member at respective locations so that the belt mounted on the pulley with which the mechanism is associated is deflected inwardly.

8 Claims, 1 Drawing Sheet

SEWING MACHINE DRIVE ASSEMBLY, INCLUDING PULLEY BELT TRACTION ENHANCEMENT DEVICE

BACKGROUND OF THE INVENTION

This invention relates generally to sewing machine drive apparatus and more particularly, but not by way of limitation, to an apparatus for enhancing traction between a pulley belt and a pulley forming part of a sewing machine main crankshaft drive assembly.

A conventional individual user type of sewing machine typically has a main crankshaft which is rotated by an electric motor. As the main crankshaft rotates, the sewing operation is performed.

The output shaft of the motor can be directly connected to the crankshaft, such as by a drive belt. In some applications, however, the power transmission occurs through a plurality of bets and one or more intermediate pulleys. One use of this type of intermediate subassembly would be for achieving speed reduction from the motor to the crankshaft.

Under light to normal operating loads, the traction between the belts and pulleys is normally sufficient to prevent the belts from jumping or slipping relative to the pulleys. Slotted pulleys and toothed belts have been used to provide mechanical engagement to avoid jumping on slipping.

Under heavy to maximum power loads, however, I have found that even the slotted pulley/toothed belt drive assembly exhibits jumping or slipping. This interrupts the smooth operation of the sewing machine and is certainly undesirable. Therefore, there is the need for providing a sewing machine drive assembly which exhibits no or reduced jumping or slipping even under maximum power loads.

SUMMARY OF THE INVENTION

The present invention overcomes the above-noted and other shortcomings of the prior art by providing a novel and improved sewing machine drive assembly which specifically includes an apparatus for enhancing traction between a pulley belt and a pulley of the assembly. The present invention reduces or eliminates jumping or slipping under maximum power load which can occur during operating a sewing machine.

The sewing machine drive assembly includes a power transmission subassembly, which subassembly comprises: a multiple groove pulley mounted on a shaft connected to a sewing machine; a belt received in one of the grooves of the pulley and received by the crankshaft of the sewing machine drive assembly; means for coupling the motor of the sewing machine drive assembly with another of the grooves of the pulley; and means for enhancing traction between the belt and the pulley so that the belt does not slip relative to the pulley under maximum power coupled from the motor.

In its broader aspects, the present invention pertains simply to the means or apparatus for enhancing traction. This comprises: a support member having a hole defined therein for receiving a shaft on which a pulley forming part of a sewing machine main crankshaft drive assembly is mounted; and first and second belt engagement members connected to the support member at respective locations spaced from the hole so that a pulley belt mounted on the pulley is pinched inwardly generally towards the pulley in response to the support member being mounted on the shaft on which the pulley is mounted.

Therefore, from the foregoing, it is a general object of the present invention to provide a novel and improved sewing machine drive assembly. Another object is to provide an apparatus for enhancing traction between a pulley belt and a pulley forming part of the drive assembly. Other and further objects, features and advantages of the present invention will be readily apparent to those skilled in the art when the following description of the preferred embodiment is read in conjunction with the accompanying drawings.

DETAILED DESCRIPTION OF THE PREFERRED EMBODIMENT

Figure 1:
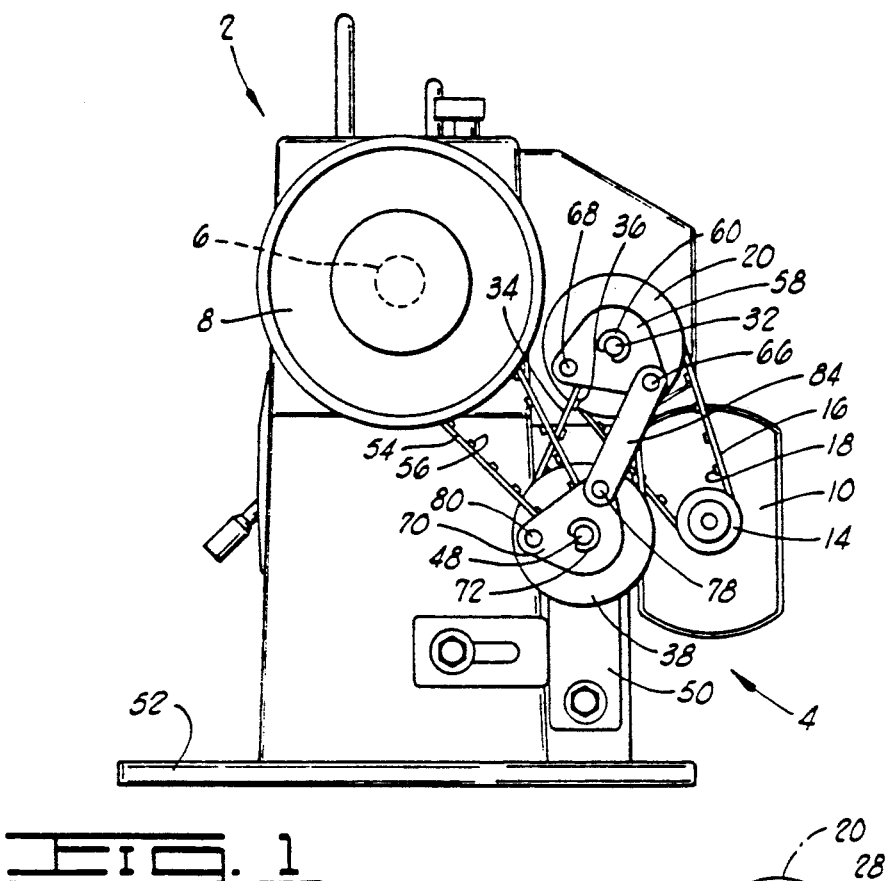
FIG. 1 is an end elevational view of a sewing machine with the preferred embodiment of the drive assembly of the present invention.
Figure 2:
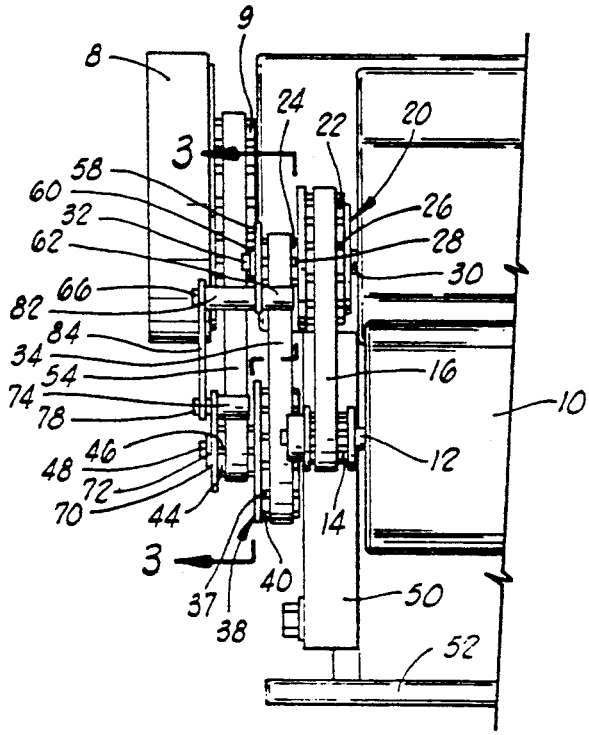
FIG. 2 is a side elevational view of the drive assembly and end portion of the sewing machine shown in FIG. 1.

An end of a sewing machine 2 to which a drive assembly 4 is connected is shown in FIGS. 1 and 2. The sewing machine 2 is of a conventional type having a main crankshaft 6 at the illustrated end of which is connected a crankshaft drive wheel 8. The wheel 8 has a transversely slotted cylindrical surface 9 (FIG. 2).

The drive assembly 4, which connects to the crankshaft drive wheel 8 to rotate the crankshaft for performing a sewing operation, includes an electric motor 10 having a suitable conventional stator and rotor. The rotor is connected to a drive shaft 12 to which a transversely slotted single-groove pulley 14 is connected. The motor 10 is connected to the sewing machine 2 in a conventional manner.

The drive assembly 4 includes a belt 16 having teeth 18 which are appropriately spaced around the inner surface of the belt 16 to mesh with the slots in the pulley 14 and with transverse slots in a pulley 20. Thus, the belt 16 couples the drive shaft 12 of the motor 10 with the pulley 20.

The pulley 20 shown in the drawings is a two-grooved pulley. In FIG. 2, one groove is identified with the reference numeral 22 and the other groove is identified with the reference numeral 24. Each groove is transversely slotted with slots 26, 28, respectively. The pulley 20 is mounted on a shaft 30 connected to the sewing machine 2. The free end 32 of the shaft 30 extends beyond the outermost side of the pulley 20.

The groove 22 receives the belt 16. Because the diameter of the groove 22 is larger than the diameter of the groove of the pulley 14 speed reduction is provided for output through the groove 24.

The drive assembly 4 also includes a belt 34 which engages the groove 24 to take off the speed reduction output from the pulley 20. The belt 34 has teeth 36 to mesh with the slots 28 of the groove 24 and to mesh with slots 37 of a pulley 38 forming another part of the drive assembly 4. Thus, the belt 34 couples the pulleys 20, 38.

The pulley 38 shown in the drawings is also a two-grooved pulley. A groove 40 has the transverse slots 37 for receiving the teeth 36 of the belt 34, and a groove 44 has transverse slots 46. The pulley 38 is rotatably mounted on a shaft 48 extending perpendicularly from a vertical support 50 connected to a base 52 of the sewing machine 2.

Because the diameter of the groove 40 is larger than the diameter of the groove 24 of the pulley 20, a further speed reduction is provided. This further speed reduction is coupled to the crankshaft drive wheel 8 by a drive belt 54 having teeth 56 which mesh with the slots 46 of the groove 44 of the pulley 38 and with the slots of the cylindrical surface 9 of the crank-shaft drive wheel 8. Thus, the belt 54 couples the pulley 38 and the crankshaft 6. Both the pulley 38 and the belt 54 are part of the drive assembly 4.

Completing the drive assembly 4 are means for enhancing traction between the belt 34 and the pulley 20 so that the belt 34 does not slip relative to the pulley 20 under maximum power coupled from the motor 10, and means for enhancing traction between the belt 54 and the pulley 38 so that the belt 54 does not slip relative to the pulley 38 under maximum power coupled from the motor. These also enhance traction between the belt 34 and the pulley 38 and between the belt 54 and the crankshaft drive wheel 8.

The means for enhancing traction for the belt 34 includes a support plate 58 having a hole which receives the end 32 of the shaft 30. The connection between the plate 58 and the shaft 3 is loose so that the plate 58 can pivot relative to the shaft 30. A retaining clip 60 is used to secure the plate 58 on the shaft 30.

Figure 3:
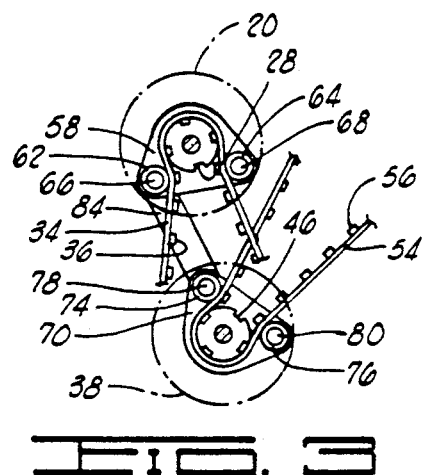
FIG. 3 is a view of the traction enhancing means of the present invention, as taken along lines 3—3 shown in FIG. 2.

This traction enhancing means also includes two belt engagement members connected to the support plate 58 at respective locations spaced from the mounting hole so that the belt 34 received on the pulley 20 is deflected as best illustrated in FIG. 3. These engagement members are defined by cylindrical sleeves 62, 64 rotatably connected to the plate 58 by respective retaining pins 66, 68. The sleeves 62, 64 can rotate relative to the pins 66, 68 to act as rollers against the outer surface of the belt 34 as the belt 34 moves in response to operation of the motor 10. As shown in FIG. 3, these rollers pinch the belt 34 inwardly generally towards the groove 24 of the pulley 20.

The traction enhancing means for the belt 54 is similarly defined. It includes a support plate 70 having a hole for receiving the end of the shaft 48. The plate 70 can pivot relative to the shaft 48, and it is retained on the shaft 48 by a retaining clip 72. As shown in FIG. 3, this traction enhancing means also includes two belt engagement members defined by cylindrical sleeve rollers 74, 76 rotatably mounted on retaining pins 78, 80, respectively. The engagement members pinch or inwardly deflect the belt 54 generally towards the groove 44 of the pulley 38 as shown in FIG. 3.

It is contemplated that the belt engagement members can be made adjustable to provide adjustable tensioning on the respective belts.

Referring to FIG. 2, it will be noted that the support plate 58 and the support plate 70 are in an offset parallel relationship. As viewed in FIG. 2, the support plate 58, which is adjacent the pulley 20, is disposed farther to the right than is the support plate 70, which is disposed adjacent the pulley 38. As also shown in FIG. 2, spanning this offset is a spacer sleeve 82 disposed between the support plate 58 and a linkage member 84. The linkage member 84 is a flat plate pivotally connected at one end to, but spaced by means of the spacer sleeve 82 from, the support plate 58. This connection is coaxial with the belt engagement member which includes the roller 62 and retaining pin 66. The other end of the linkage plate is pivotally connected to the support plate 70 coaxially with the belt 54 engagement member which includes the roller 74 and retaining pin 78. The linkage member 84 stabilizes the pivotation of the support plates 58, 70 during operation of the drive assembly.

During such operation, the motor 10 is energized in a conventional manner to rotate the drive belts 16, 34, 54 whereby power is transmitted from the motor 10 to the crankshaft 6. As the load on the motor increases, there has heretofore been a tendency for the belts 34, 54 to slip or jump relative to the grooves of the pulleys they engage even with the normal meshing teeth and slots. In the present invention, however, this tendency is resisted by the inward deflection provided by the rollers 62, 64, 74, 78 of the traction enhancement means.

Thus, the present invention is well adapted to carry out the objects and attain the ends and advantages mentioned above as well as those inherent therein. While a preferred embodiment of the invention has been described for the purpose of this disclosure, changes in the construction and arrangement of parts can be made by those skilled in the art, which changes are encompassed within the spirit of this invention as defined by the appended claims.

What is claimed is:

1. An apparatus for enhancing traction between a pulley belt and a pulley forming part of a sewing machine main crankshaft drive assembly, said apparatus comprising:

a support member having a hole defined therein for receiving a shaft on which the pulley forming part of the sewing machine main crankshaft drive assembly is mounted; and first and second belt engagement members connected to said support member at respective locations spaced from said hole so that the pulley belt mounted on the pulley is pinched at two locations by said engagement members inwardly generally towards the pulley when said support member is mounted on the shaft on which the pulley is mounted.

2. A traction enhancing apparatus as defined in claim 1, further comprising:

a second support member having a hole defined therein for receiving a second shaft on which a second pulley forming part of the sewing machine main crankshaft drive assembly is mounted;

third and fourth belt engagement members, connected to said second support member at respective locations spaced from said hole of said second support member so that a second pulley belt, mounted on the second pulley, is pinched at two locations by said third and fourth belt engagement members inwardly generally towards the second pulley when said second support member is mounted on the second shaft on which the second pulley is mounted; and a linkage member having one end connected to the first mentioned support member and having another end connected to said second support member.

3. A power transmission subassembly for a sewing machine drive assembly, wherein said sewing machine drive assembly includes a crankshaft drive wheel and a motor, said subassembly comprising:

a multiple groove pulley mounted on a pulley shaft connected to a sewing machine;

a belt disposed in a closed loop received on one of the grooves of said pulley and received on the crankshaft drive wheel of the sewing machine drive assembly;

means for coupling the motor of the sewing machine drive assembly with another of the grooves of said pulley; and means for enhancing traction between said belt and said pulley so that said belt does not slip relative to said pulley under maximum power coupled from the motor, wherein said means for enhancing traction includes:
 a support member having a hole defined therein receiving the pulley shaft on which said pulley is mounted; and
 first and second belt engagement members connected to said support member at respective locations spaced from said hole so that the closed loop of said belt is deflected inwardly at two locations adjacent said pulley.

4. A power transmission subassembly for a sewing machine drive assembly, wherein said sewing machine drive assembly includes a crankshaft drive wheel and a motor, said subassembly comprising:
 a multiple groove pulley mounted on a pulley shaft connected to a sewing machine,
 a belt disposed in a closed loop received on one of the grooves of said pulley and received on the crankshaft drive wheel of the sewing machine drive assembly;
 means for coupling the motor of the sewing machine drive assembly with another of the grooves of said pulley;
 means for enhancing traction between said belt and said pulley so that said belt does not slip relative to said pulley under maximum power coupled from the motor; and
 wherein said means for coupling includes:
  a second multiple groove pulley, mounted on a second shaft connected to the sewing machine;
  a second belt disposed in a closed loop received on one of the grooves of said second pulley and on said another of the grooves of the first-mentioned pulley;
  means for coupling the motor of the sewing machine drive assembly with another of the grooves of said second pulley; and
  means for enhancing traction between said second belt and said second pulley so that said second belt does not slip relative to the first mentioned pulley or said second pulley under maximum power coupled from the motor.

5. A power transmission subassembly as defined in claim 4, wherein:
 said means for enhancing traction between said first mentioned belt and said first mentioned pulley includes:
  a first support member having a hole defined therein receiving the pulley shaft on which said first mentioned pulley is mounted; and
  first and second belt engagement members connected to said first support member at respective locations spaced from said hole so that the closed loop of said first mentioned belt received on said pulley is deflected inwardly at two locations adjacent said first mentioned pulley; and
 said means for enhancing traction between said second belt and said second pulley includes:
  a second support member having a hole defined therein receiving the second shaft, on which said second pulley is mounted; and
  third and fourth belt engagement members, connected to said second support members at respective locations spaced from said hole of said second support member so that the closed loop of said second belt is deflected inwardly at two locations adjacent said second pulley.

6. A power transmission subassembly as defined in claim 5, wherein said second support member is linked to the first-mentioned support member.

7. A drive assembly for a sewing machine having a crankshaft, said assembly comprising:
 a motor connected to a sewing machine, said motor having a rotor;
 a first shaft connected to the sewing machine;
 a first two-grooved pulley, mounted for rotation on said first shaft;
 a second shaft connected to the sewing machine;
 a second two-grooved pulley, mounted for rotation on said second shaft;
 a first belt, coupling said rotor of said motor and said first pulley;
 a second belt, coupling said first and second pulleys;
 a third belt, coupling said second pulley and the crankshaft of the sewing machine;
 a first plate, pivotably mounted on said first shaft adjacent said first pulley;
 first and second parallel rollers, connected to said first plate so that said first and second rollers engage said second belt;
 a second plate, pivotably mounted on said second shaft adjacent said second pulley in offset parallel relationship with said first plate; and
 third and fourth parallel rollers, connected to said second plate so that said third and fourth rollers engage said third belt.

8. A drive assembly as defined in claim 7, further comprising a link plate pivotably connected at one end to said first plate coaxially with one of said first and second rollers and pivotably connected at another end to said second plate coaxially with one of said third and fourth rollers.

* * * * *